(12) United States Patent
Lehmann

(10) Patent No.: US 11,999,181 B2
(45) Date of Patent: *Jun. 4, 2024

(54) LASER INDUCED TRANSFER PRINTING PROCESS

(71) Applicant: Heliosonic GmbH, Wesel (DE)

(72) Inventor: Udo Lehmann, Wesel (DE)

(73) Assignee: Heliosonic GmbH

( * ) Notice: Subject to any disclaimer, the term of this patent is extended or adjusted under 35 U.S.C. 154(b) by 253 days.

This patent is subject to a terminal disclaimer.

(21) Appl. No.: 17/640,386

(22) PCT Filed: Aug. 20, 2020

(86) PCT No.: PCT/EP2020/073394
§ 371 (c)(1),
(2) Date: Mar. 4, 2022

(87) PCT Pub. No.: WO2021/047886
PCT Pub. Date: Mar. 18, 2021

(65) Prior Publication Data
US 2022/0297460 A1 Sep. 22, 2022

(30) Foreign Application Priority Data

Sep. 10, 2019 (EP) ..................... 19196302

(51) Int. Cl.
*B41M 5/392* (2006.01)
*B41M 5/385* (2006.01)
(Continued)

(52) U.S. Cl.
CPC ............ *B41M 5/392* (2013.01); *B41M 5/385* (2013.01); *B41M 5/395* (2013.01); *B41M 5/465* (2013.01);
(Continued)

(58) Field of Classification Search
CPC ...... B41M 5/385; B41M 5/392; B41M 5/395; B41M 5/465; B41M 2205/08;
(Continued)

(56) References Cited

U.S. PATENT DOCUMENTS

| 5,021,808 A | 6/1991 | Kohyama |
| 5,312,683 A | 5/1994 | Chou |

(Continued)

FOREIGN PATENT DOCUMENTS

| CN | 102576576 | 7/2012 |
| DE | 10210146 | 9/2003 |

(Continued)

OTHER PUBLICATIONS

International Preliminary Report of Patentability for International Application No. PCT/EP2020/073394 dated Dec. 2, 2021 (12 pages).

(Continued)

*Primary Examiner* — Gerard Higgins
(74) *Attorney, Agent, or Firm* — Fitch, Even, Tabin & Flannery LLP

(57) ABSTRACT

Printing process in which a substrate to be printed is disposed opposite an ink carrier having an ink layer, the ink layer being irradiated regionally by a laser beam, said layer accelerating by absorption of the laser beam in the substrate direction, wherein for laser absorption the ink layer comprises reflective particles, a solvent, and a soluble polymer, wherein the reflective particles have an aspect ratio>25, the aspect ratio being defined as the average particle size/average particle thickness.

18 Claims, 1 Drawing Sheet

(51) Int. Cl.
    *B41M 5/395* (2006.01)
    *B41M 5/46* (2006.01)
    *C09D 11/033* (2014.01)
    *C09D 11/037* (2014.01)
    *C09D 11/14* (2006.01)

(52) U.S. Cl.
    CPC .......... *C09D 11/033* (2013.01); *C09D 11/037* (2013.01); *C09D 11/14* (2013.01); *B41M 2205/08* (2013.01); *B41M 2205/30* (2013.01)

(58) Field of Classification Search
    CPC ............. B41M 2205/30; C09D 11/033; C09D 11/037; C09D 11/106; C09D 11/14
    See application file for complete search history.

(56) References Cited

U.S. PATENT DOCUMENTS

| | | | |
|---|---|---|---|
| 5,459,016 | A | 10/1995 | Debe |
| 5,516,622 | A | 5/1996 | Savini |
| 5,518,861 | A | 5/1996 | Coveleskie |
| 6,222,567 | B1 | 4/2001 | Schuster |
| 6,241,344 | B1 | 6/2001 | Machida |
| 8,922,611 | B1 | 12/2014 | Benton |
| 2006/0181600 | A1 | 8/2006 | Bourdelais |
| 2011/0310205 | A1 | 12/2011 | Kleine |
| 2012/0164777 | A1 | 6/2012 | Kleine Jaeger |
| 2016/0167400 | A1 | 6/2016 | Ruiz Vega |
| 2021/0086541 | A1 | 3/2021 | Speer |

FOREIGN PATENT DOCUMENTS

| | | |
|---|---|---|
| JP | S60071260 | 4/1985 |
| JP | S62184859 | 8/1987 |
| JP | S62218137 | 9/1987 |
| JP | S6377781 | 4/1988 |
| JP | S63290789 | 11/1988 |
| JP | H01108076 | 4/1989 |
| JP | H1245093 | 9/1989 |
| JP | H01301268 | 12/1989 |
| JP | H02591 | 1/1990 |
| JP | H02225053 | 9/1990 |
| JP | H02235643 | 9/1990 |
| JP | H624151 | 2/1994 |
| JP | H732774 | 2/1995 |
| JP | H7172074 | 7/1995 |
| JP | H7195834 | 8/1995 |
| JP | H8197862 | 8/1996 |
| JP | H09193391 | 7/1997 |
| JP | H7290837 | 5/1999 |
| JP | H11138773 | 5/1999 |
| JP | 2001158177 | 6/2001 |
| JP | 2001158182 | 6/2001 |
| JP | 2001199170 | 7/2001 |
| JP | 2001253178 | 9/2001 |
| JP | 2008055618 | 3/2008 |
| JP | 2008520452 | 6/2008 |
| JP | 2010505640 | 2/2010 |
| JP | 2010083133 | 4/2010 |
| JP | 2012512067 | 5/2012 |
| JP | 2012144669 | 8/2012 |
| JP | 2015091647 | 5/2015 |
| JP | 2015134500 | 7/2015 |
| WO | 2008092650 | 8/2008 |
| WO | 2019154980 | 8/2019 |
| WO | 2019162212 | 8/2019 |
| WO | 2021047886 | 3/2021 |

OTHER PUBLICATIONS

International Search Report and Written Opinion for International Application No. PCT/EP2020/073394 dated Nov. 17, 2020 (10 pages).

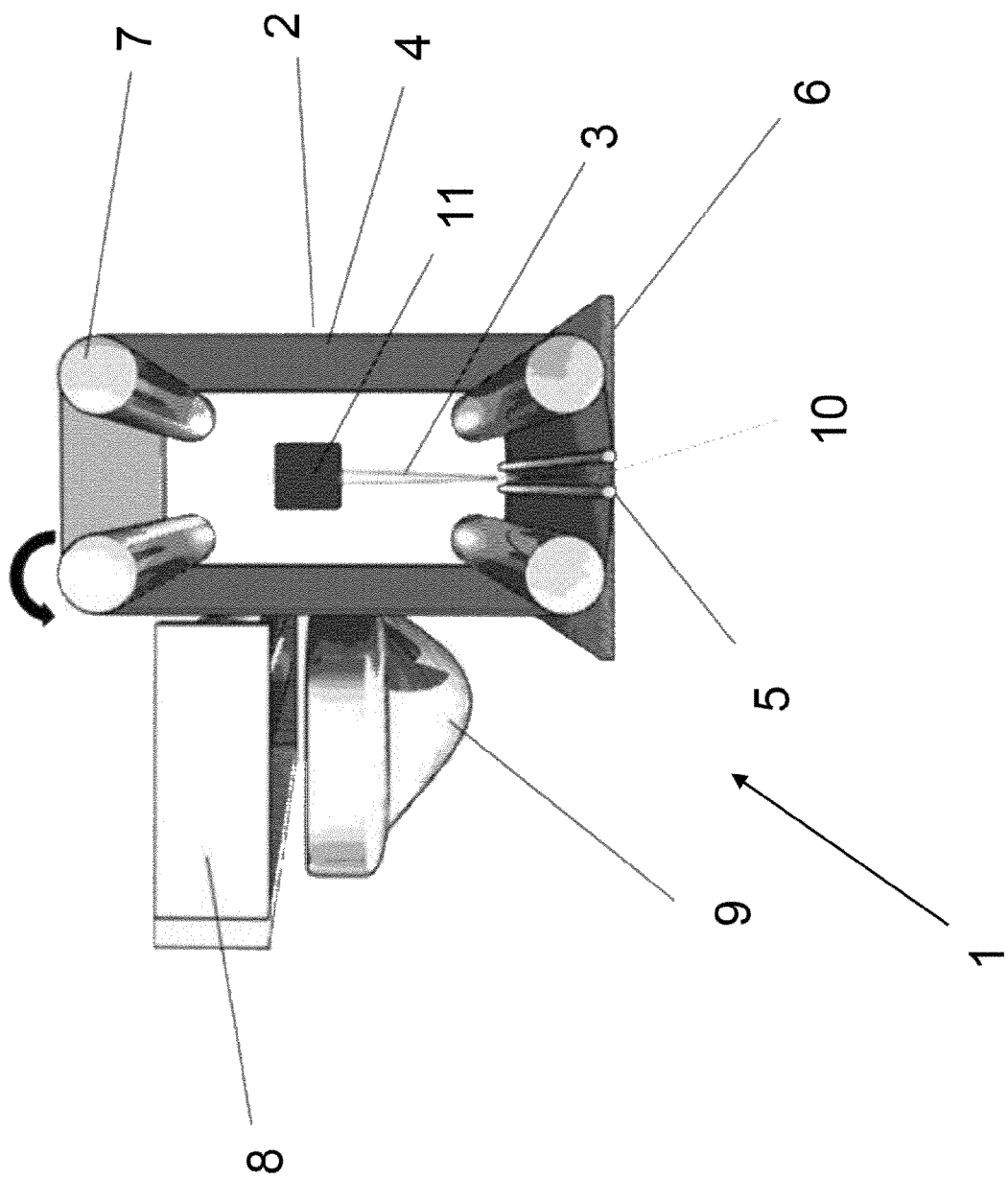

LASER INDUCED TRANSFER PRINTING PROCESS

The invention relates to a printing process and to the use of an ink.

A process for printing a substrate in which drops of ink are transferred from an ink-coated carrier onto a substrate to be printed is known from, for example, U.S. Pat. No. 6,241,344 B1. To transfer the ink, energy is introduced through the carrier into the ink on the carrier at the position at which the substrate is to be printed. This causes vaporization of a part of the ink, and so the ink parts from the carrier. As a result of the pressure of the vaporizing ink, the drop of ink thus parted is propelled onto the substrate.

By introducing the energy in a directed way it is possible hereby to transfer the ink onto the substrate in accordance with a pattern to be printed. The energy needed to transfer the ink is introduced, for example, by a laser. The carrier bearing the applied ink is, for example, a circulating ribbon, to which ink is applied by means of an application device before the printing region. The laser is located in the interior of the circulating ribbon, and so the laser acts on the carrier on the side facing away from the ink. Application of the ink to the ink carrier is accomplished, for example, by a roll which is immersed in an ink reservoir.

A printing machine of this kind is also known from, for example, U.S. Pat. No. 5,021,808 A. In accordance with the teaching of this document as well, ink is applied from a reservoir container, using an application device, to a circulating ribbon, there being situated within the circulating ribbon a laser by means of which the ink is vaporized at mandated positions and is thrown accordingly onto the substrate to be printed. The ribbon in this case is made of a material transparent to the laser. For targeted vaporization of the ink it is possible for the circulating ribbon to be coated with an absorption layer, in which the laser light is absorbed and is converted into heat, and so the ink is vaporized at the position of exposure to the laser.

Furthermore, it is known through laid-open specification DE 102 10 146 A1 that by using small, laser-absorbing particles it is possible to boost the efficiency of the laser-induced printing process. This is important in that it allows a significant increase in the productivity of the process described.

One disadvantage when using absorption particles is that these particles very often also absorb in the visible wavelength spectrum, resulting in a more or less strong discoloration of the ink (liquid ink) that is to be printed.

A further disadvantage is that the laser-induced ejection of the particles may be accompanied by emission of numerous disruptive much smaller particles, so-called satellites, which deteriorates the quality of the printing result.

The object of the invention, by comparison, is at least to reduce the stated disadvantages of the prior art. Generally, the aim is to achieve a good printing result.

The object of the invention is already achieved by a printing process according to claim 1.

Preferred embodiments and developments of the invention are apparent from the subject-matter of the dependent claims and also the description.

The invention relates to a printing process in which a substrate to be printed is disposed opposite an ink carrier having an ink layer, the ink layer being irradiated regionally by a laser beam, characterized in that the ink layer comprises reflective particles, a solvent, and a soluble polymer dissolved in the solvent, wherein the reflective particles have an aspect ratio>25, wherein the aspect ratio is defined as the average particle size/average particle thickness.

In one embodiment of the printing process according to the present invention, the reflective particles have an aspect ratio>50.

In a further embodiment of the printing process according to the present invention, the reflective particles have an average particle thickness $P_T < 80 + 3\ P_S$, wherein $P_T$ is the absolute value of the average particle thickness in nm and $P_S$ is the absolute value of the average particle size in μm.

Consequently, according to this embodiment of the printing process the reflective particles have an aspect ratio>25 and $P_T < 80 + 3\ P_S$.

The ink layer can be formed by coating an ink ribbon with an ink that comprises reflective particles, a soluble polymer, dyes and/or pigments, and a solvent. The soluble polymer is a polymer that is solvable in the solvent that is used as solvent for the ink composition.

In accordance with the invention, the ink used for the process of the invention is admixed with reflective particles for the purpose of laser absorption on the part of the ink layer.

The reflective particles might have also adsorbing properties in respect to the laser beam, especially in the wavelength range of the laser used, more particularly in the range of 300 to 3000 nm. However, in contrast to absorption particles like carbon black particles, reflective particles have also reflective properties concerning the visible wavelength spectrum.

Particles which have a high reflection relative to the wavelength of the laser used, more particularly 300 to 3000 nm, might be used.

In contrast to absorption particles known from the prior art, such as carbon black, for example, the reflective particles may be substantially neutral for the coloured impression conveyed by the ink layer.

Particles which can be used are, first, for example, particles of metal or of a metal-coated carrier material. These particles produce reflection on the basis of mirroring surfaces. In particular it is possible to use what are called effect pigments, preferably lustre pigments.

The reflective particles may be added in particular in an amount of more than 1 and/or less than 10 wt. % to the ink that is used for the ink layer.

Further, transparent particles can be used which develop a mirroring effect by virtue of total reflections. Particles having an optical interference coating can also be used.

According to one embodiment of the invention, particles having a mean particle size of 0, 1 to 25 μm are used. For some applications it might be favourable to have a particle size in the range of 1 to 15 μm.

In this way, particularly effective absorption can be achieved.

In order to achieve a high reflection effect, particles may be used which have an L* value in the L*a*b* colour space of more than 50, preferably more than 70 and more preferably more than 80.

Further, the particles, in particular aluminium particles, may be neutral in colour. In one embodiment the particles in the L*a*b* colour space have an a* and/or b* value of +/−30. Use may be made more particularly of particles having an a* and/or b* value in the L*a*b* colour space of less than +/−5, preferably +/−3.

In the process according to the present invention use reflective materials composed of metal and metal-coated polymeric particles can be used.

The invention further relates to a printing process in which a substrate to be printed is disposed opposite an ink carrier having an ink layer, the ink layer being irradiated regionally by a laser beam, and said layer accelerating by absorption of the laser beam in the substrate direction, wherein laser absorption is generated by particles.

According one aspect of the invention, a soluble polymer having a molecular weight Mw of greater than 250,000 g/mol is added as additive to a solvent of the ink used for the ink layer.

The ink comprises in particular a solvent, a dye, more particularly a pigment, and also particles which boost absorption of the laser light, more particularly the reflective particles described above.

It was found that by adding a polymer which is soluble in the solvent, it is possible to reduce significantly the risk of formation of satellites (splashes).

weight range from about Mw: 250,000 g/mol to about 1,500,000 g/mol has a positive influence on the print behaviour of the ink.

These admixtures modify what is called the elasticity of the ink. Admixtures of soluble polymers with a Mw smaller than 250,000 g/mol have only a thickening effect and show clear splash properties. Polymers with higher Mw values (>1,500,000 g/mol) lead in contrast to no further improvement in the anti-splash properties, but merely further hinder the solubility. Preference is therefore given to using a polymer having a molecular weight (Mw) below 2,500,000 g/mol, more preferably below 1,500,000 g/mol.

The Table 1 examples of suitable soluble polymer admixtures with various solvents customary within the printing industry, and the amounts typically used in the total ink mixture (in wt. %) that show good anti-splash properties.

TABLE 1

| Solvent | Cellulose ester | Cellulose nitrate | Cellulose ether | Polyurethane | Vinyl polymer |
|---|---|---|---|---|---|
| Glycol ether | | | | | |
| Ethoxypropanol | 0.1-0.2% | 0.1-0.2% | 0.1-0.2% | 0.05-0.15% | 0.2-0.3% |
| Methoxypropanol | 0.1-0.2% | 0.1-0.2% | 0.1-0.2% | 0.05-0.15% | 0.2-0.3% |
| Alcohol | | | | | |
| Ethanol | 0.2-0.5% | 0.2-0.5% | 0.2-0.5% | 0.1-0.3% | 0.15-0.35% |
| Propanol | 0.2-0.5% | 0.2-0.5% | 0.2-0.5% | 0.1-0.3% | 0.15-0.35% |
| Ester | | | | | |
| Ethyl acetate | 0.2-0.8% | 0.2-0.8% | 0.2-0.8% | 0.2-0.8% | 0.2-0.8% |
| Butyl acetate | 0.2-0.8% | 0.2-0.8% | 0.2-0.8% | 0.2-0.8% | 0.2-0.8% |
| arom. hydrocarbon | | | | | |
| Toluene | 0.1-0.4% | 0.1-0.4% | 0.1-0.4% | | |
| Xylene | 0.1-0.4% | 0.1-0.4% | 0.1-0.4% | | |
| Dialkyl ether | | | | | |
| Di-n-butyl ether | 0.25-0.5% | 0.25-0.5% | 0.25-0.5% | 0.25-0.5% | 0.25-0.5% |
| Glycol ester | | | | | |
| 2-Methoxyethyl acetate | 0.1-0.4% | 0.1-0.4% | 0.1-0.4% | 0.1-0.4% | 0.1-0.4% |
| Glycol ether | | | | | |
| Butyl glycol | 0.2-0.6% | 0.2-0.6% | 0.2-0.6% | 0.2-0.6% | 0.2-0.6% |

The proportion of the soluble polymer is according to one embodiment of the invention 0.05-2 wt. %, of the total ink mixture. The proportion of the soluble polymer is preferably more than 0.05 and/or less than 1 wt. %, typically more than 0.1 and/or less than 0.8 wt. %, of the total ink mixture.

The soluble polymer used according to one preferred embodiment of the invention comprises a cellulose ester, a cellulose nitrate, a cellulose ether, more particularly a hydroxypropylcellulose, a polyurethane or a vinyl polymer. Hydroxypropylcellulose in particular, in other words a cellulose ether in which some of the hydroxyl groups are linked as ethers with hydroxypropyl groups, appears particularly suitable for the effect of the invention.

Suitable solvents that can be used in the composition that is used in the ink composition used in the present invention include glycol ethers, alcohols, esters, aromatic hydrocarbons, dialkyl ethers, glycol esters and glycol ethers.

It was found that disruptive splashes do not form at all or only to a greatly reduced extent when the rheology of the printing ink is modified. It was found that the low-level admixing of soluble polymers in the average molecular The invention further relates to the use of an ink having reflective particles having an aspect ratio>25 and a soluble polymer for a printing process as described above.

BRIEF DESCRIPTION OF THE DRAWINGS

The subject matter of the invention is to be elucidated in more detail below, referring to the drawing of FIG. 1.

FIG. 1 is a schematic view of a printing machine used for the process of the invention.

DETAILED DESCRIPTION OF THE DRAWING

FIG. 1 is a schematic view of one exemplary embodiment of a printing machine (1) of the invention.

The printing machine (1) comprises as ink carrier (4) a circulating ink ribbon.

The ink ribbon is coated homogeneously and over its full area with ink (2) by the inking unit (8). The ink ribbon subsequently moves in the arrow direction to the printing nip (10). The ink carrier (4) is distanced by a gap from the substrate (6) to be printed. Preferably the width of the gap is adjustable and/or is regulated continuously. This can be done by means, for example, of adaptable distancing rolls (5).

In the printing nip (10), using a laser scanner (11), a laser beam (3) is focused through the ink carrier (4), which is permeable to the laser light, into the ink (2). The local and targeted heating of parts of the ink (2) by means of the laser beam (3) causes explosive vaporization of a small region of the ink (2), and so a part of the printing ink (2) is transferred from the ink ribbon onto the opposite substrate (6).

The ink ribbon, controlled by the distancing rolls (5) and the deflection rollers (7), subsequently moves back in the direction of the inking unit (8). On contact between inking unit (8) and the ink ribbon, the ink (2) consumed is replenished.

The excess ink (2) in the inking unit (8) is collected in the ink trough (9) at the bottom and is added continuously in repetition to the printing operation.

Measurement Methods

Average particle size: The particle size distribution is measured by laser scattering granulometry using a Helos/BR Multirange (Sympatec) apparatus according to the manufacturer indications and in accordance to ISO 13320-1. The particles are dissolved in isopropanol under stirring before measuring the particle size distribution. The particle size function is calculated in the Fraunhofer-approximation as a volume weighted cumulative frequency distribution of equivalent spheres. The median value d50 means that 50% of the measured particles are below this value (in a volume-averaged distribution). The d50 value is taken as the average particle size.

Average particle thickness: The particle diameter is determined using a reflective electron microscope (REM). A resin customarily used in electron microscopy, for example TEMPFIX (Gerhard Neubauer Chemikalien, D-48031 Munster, Germany), is applied to a sample plate and heated to softening on a hotplate. Subsequently, the sample plate is taken from the hotplate and the sample to be measured is scattered onto the softened resin. In the measurement of the thickness, the azimuthal angle α of the pigment is estimated relative to a plane normal to the surface and allowed for when evaluating the thickness according to the formula $H_{eff}=H_{mes}/\cos \alpha$.

The cumulative frequency curve was plotted from the $H_{eff}$ values with the aid of the relative frequencies of occurrence. At least about 100 particles are counted and the average value of $H_{eff}$ is taken as the average particle thickness.

L*a*b values: The values in L*a*b* colour space are determined using a DTM 1045® spectrophotometer at an angle between 15 and 25°.

Molecular weight: The weight average (Mw) of the molecular weight of the soluble polymer is determined according to DIN 55672-2: 2016-3.

Examples

Various ink compositions were prepared comprising different reflective aluminium particles. Using the process described in U.S. Pat. No. 6,241,344 B1 the transfer of the aluminium particles to a substrate was measured. The ink compositions were prepared by mixing the following ingredients:

43 wt. % of ethanol
32 wt. % of methoxypropanol
10 wt. % of a 3% solution of klucel in water
1.5 wt. % of ethylcellulose
1.5 wt. % of polyvinylbutyral
12 wt. % of a reflective aluminium pigment The results are presented in table 2.

TABLE 2

| Example | Average particle size $P_s$ (µm) | Average particle thickness $P_t$ (nm); (µm) | Aspect ratio | Amount of pigment transferred to substrate (mg) |
|---|---|---|---|---|
| Ex 1 | 9.95 | 40; 0.04 | 249 | 28.10 |
| Ex 2 | 10.90 | 90; 0.09 | 121 | 16.10 |
| Ex 3 | 9.73 | 130; 0.13 | 75 | 7.24 |
| Ex 4 | 2.45 | 30; 0.03 | 82 | 37.6 |

To test the effect of the molecular weight of the soluble polymer on the splash behaviour, various experiments were performed. In the ink compositions, 3-Ethoxy-1-propanol was used as solvent, in combination with reflective aluminium particles. The experiments have been summarized in Table 3.

These experiments clearly show that a soluble polymer with a Mw>100,000 significantly reduces the splashing.

TABLE 3

| Example | Cellulose ether Mw | total proportion | scattered splashs % |
|---|---|---|---|
| Ex. 5* |  | No polymer | 100% |
| Ex. 6* | 100.000 | 1% | ca. 90% |
| Ex. 7 | 300.000 | 1% | ca. 70% |
| Ex. 8 | 800.000 | 1% | ca. 10% |
| Ex. 9 | 1.200.000 | 1% | ca. 10% |

*Comparative Example

LIST OF REFERENCE NUMERALS RELATING TO FIG. 1

1. Printing machine
2. Ink
3. Laser beam
4. Ink carrier
5. Distancing roll
6. Substrate
7. Deflection roller
8. Inking unit
9. Ink trough
10. Printing nip
11. Laser scanner

The invention claimed is:

1. Printing process comprising: disposing a substrate to be printed opposite an ink carrier including an ink layer, and regionally irradiating the ink layer with a laser beam, wherein the ink layer comprises reflective particles, a solvent, and a soluble polymer dissolved in the solvent, the reflective particles have an aspect ratio>25, the aspect ratio being defined as the average particle size/average particle thickness, and the reflective particles comprise metal or a metal-coated carrier material, the soluble polymer comprising one or more of a cellulose ester, a cellulose nitrate, and a polyurethane.

2. Printing process according to claim 1, wherein for the reflective particles $P_T<80+3 P_S$, wherein $P_T$ is the absolute value of the average particle thickness in nm and $P_S$ is the absolute value of the average particle size in µm.

3. Printing process according to claim 1, wherein the reflective particles have an average particle size in the range of 0.1-25 µm.

4. Printing process according to claim 1, the soluble polymer having a weight average (Mw) molecular weight of greater than 250,000 g/mol, where the weight average (Mw) molecular weight of the soluble polymer is determined according to DIN 55672-2: 2016-3.

5. Printing process according to claim 1, wherein the soluble polymer has a weight average (Mw) molecular weight of 250,000 g/mol to 2,500,000 g/mol, where the weight average (Mw) molecular weight of the soluble polymer is determined according to DIN 55672-2: 2016-3.

6. Printing process according to claim 5, wherein the soluble polymer has a weight average (Mw) molecular weight of 250,000 g/mol to 1,500,000 g/mol.

7. Printing process according to claim 1, wherein the proportion of the soluble polymer accounts for between 0.05 to 2 wt. %, of a total ink mixture comprised in the ink layer.

8. Printing process according to claim 7, wherein the proportion of the soluble polymer accounts for between 0.05 to 1 wt. %, of a total ink mixture comprised in the ink layer.

9. Printing process according to claim 7, wherein the proportion of the soluble polymer accounts for between 0.1 and 0.8 wt. %, of a total ink mixture comprised in the ink layer.

10. Printing process according to claim 1, wherein the soluble polymer further comprises a vinyl polymer.

11. Printing process according to claim 10, wherein the reflective particles have an L* value in the L*a*b* colour space of more than 50 and an a* and/or b* value in the L*a*b* colour space of between −5 and 5.

12. Printing process according to claim 10, wherein the soluble polymer further comprises a hydroxypropylcellulose.

13. Printing process according to claim 11, wherein the reflective particles have an a* and/or b* value in the L*a*b* colour space of between −3 and 3.

14. Printing process according to claim 10, wherein the reflective particles have an L* value in the L*a*b* colour space of more than 70 and an a* and/or b* value in the L*a*b* colour space of between −5 and 5.

15. Printing process according to claim 14, wherein the reflective particles have an a* and/or b* value in the L*a*b* colour space of between −3 and 3.

16. Printing process according to claim 10, wherein the reflective particles have an L* value in the L*a*b* colour space of more than 80 and an a* and/or b* value in the L*a*b* colour space of between −5 and 5.

17. Printing process according to claim 16, wherein the reflective particles have an a* and/or b* value in the L*a*b* colour space of between −5 and 5.

18. Printing process according to claim 1, the soluble polymer comprising one or more of the cellulose ester and the cellulose nitrate.

* * * * *